Dec. 15, 1959 C. A. NERACHER ET AL 2,916,943
POWER TRANSMISSION
Original Filed May 9, 1939 6 Sheets-Sheet 1

INVENTORS.
Carl A. Neracher,
William T. Dunn.
BY
Harness & Harris
ATTORNEYS.

Dec. 15, 1959 C. A. NERACHER ET AL 2,916,943
POWER TRANSMISSION
Original Filed May 9, 1939 6 Sheets-Sheet 3

INVENTORS.
Carl A. Neracher,
William T. Dunn.
BY
Harness & Harris
ATTORNEYS.

Dec. 15, 1959 C. A. NERACHER ET AL 2,916,943
POWER TRANSMISSION

Original Filed May 9, 1939 6 Sheets-Sheet 5

INVENTORS.
Carl A. Neracher,
William T. Dunn.
BY
Harness & Harris
ATTORNEYS.

Dec. 15, 1959     C. A. NERACHER ET AL     2,916,943
POWER TRANSMISSION Original Filed May 9, 1939     6 Sheets–Sheet 6

Fig. 13.

INVENTORS,
Carl A. Neracher,
William T. Dunn.
BY
ATTORNEYS.

United States Patent Office 2,916,943
Patented Dec. 15, 1959

2,916,943

POWER TRANSMISSION

Carl A. Neracher and William T. Dunn, Detroit, Mich., assignors to Chrysler Corporation, Highland Park, Mich., a corporation of Delaware Original application May 9, 1939, Serial No. 272,734. Divided and this application July 28, 1944, Serial No. 547,003

6 Claims. (Cl. 74—472)

This invention relates to power transmissions and refers more particularly to improved driving systems for motor vehicles.

This application is a division of copending application Serial No. 272,734, filed May 9, 1939.

It is an object of our invention to provide a transmission system affording improved characteristics of change speed control.

Another object of our invention is to provide a transmission affording improved means for changing speed ratios through the medium of positively interengaging clutch means.

Our invention is characterized by the provision of power transmission drives of relatively different ratios which for comparison may be conveniently termed a relatively slow speed drive and a relatively fast speed drive. Our relatively slow speed drive is automatically brought in operation by the provision of a control device, preferably of the overrunning type, which renders the slow speed drive effective as for example, when the fast speed drive is released and the engine is accelerated, this control device further serving to automatically release the slow speed drive by an overrunning action in response to engine coast whereby the engine connected parts will slow down to permit relative interengagement of positive type control elements which, when engaged, renders the fast speed drive operative.

The aforesaid arrangement of drive control, according to our invention, embodies a servo-motor which is adapted to provide power interengagement of the drive control elements and to maintain such elements engaged while the motor is energized, spring means being provided to bias said drive control elements into relative disengagement upon de-energization of said motor.

Our invention further embodies means responsive to the speed of the vehicle for controlling energization of said motor such that the aforesaid coast step-up will occur only at or above a predetermined vehicle speed.

A further feature of our invention resides in the provision of motor means operable to engage and hold engaged the positively interengageable drive control elements of the fast speed drive in conjunction with down-shift control while the accelerator pedal is depressed attended by momentary slackening or release of torque at the drive control elements in order to unload the same and facilitate their disengagement coincidentally with de-energization of the motor so that the spring means may then operate to bias the interengaged control elements into relative disengagement and thereby release the fast speed drive. The downshift control is arranged to operate even when the speed responsive means would normally maintain the fast speed drive, the downshift control being preferably arranged for operation at the will of the driver, as by fully depressing the accelerator pedal, and also in response to bringing the vehicle to rest by causing the vehicle speed responsive means to deenergize the motor.

Further objects and advantages of our invention will be more apparent from the following illustrative embodiment of one form of our invention in which.

Figures 1, 3:
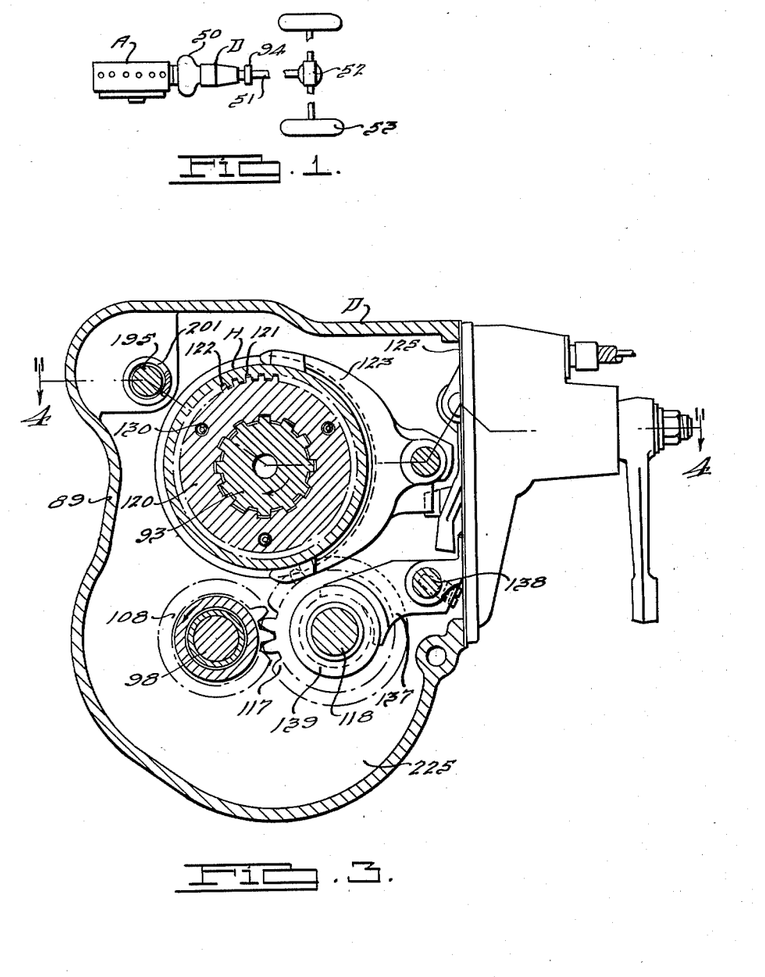
Fig. 1 is a plan view somewhat diagrammatically illustrating the power transmission assembly in relation to the vehicle driving ground wheels.
Fig. 3 is a transverse sectional view looking rearwardly as indicated by line 3—3 of Fig. 2, showing the transmission reverse gearing.

We have illustrated the principles of our invention in connection with a motor vehicle drive wherein the usual engine A transmits its drive through clutching means within casing 50, preferably through a fluid coupling and standard type main friction clutch, the drive then passing through the change speed transmission D and propeller shaft 51 (Fig. 1) to the differential 52 and thence to the vehicle ground wheels 53 where it is desired to drive the rear wheels according to present day practice.

We preferably transmit the drive from the engine A to transmission D through a fluid coupling of the kinetic type preferably in conjunction with a releasable friction clutch of a conventional design employed to facilitate manual shifts in transmission D and to accommodate stopping the car in gear without tendency of the coupling to cause the car to creep especially where the idle is set "fast" (as during winter starting) or where the throttle is accidently opened.

By preference, the arrangement is such that a "faster" rear axle ratio is afforded than is generally customary so that when the transmission is in the relatively fast speed drive such as direct drive, the car is driven in the equivalent of an overdrive ratio between the engine A and wheels 53. Our arrangement provides such conveniently operable kickdown or shift to the relatively slow speed drive such as a reduction drive from direct that the aforesaid arrangement is practicable thereby obtaining advantages of economy, long life and quietness of operation without the disadvantages of sluggish operation, especially for city driving conditions.

The engine A has the customary throttle valve operable throughout a range between closed throttle position for engine idling and a wide open position, the throttle being adjusted by a driver operable accelerator pedal 59 (Fig. 13) to swing downwardly against restoring spring 62 to thrust through the system of pivotally jointed links 63, 64, and connecting lever 65, the link 64 being suitably connected to the throttle valve.

The kickdown by accelerator pedal movement is utilized to momentarily unload the engine of its drive, as by shorting the ignition, and to effect disengagement of the synchronous clutch sleeve for a change in the transmission from direct to underdrive accommodated by unloading the clutch sleeve of the engine drive. The throttle being open will cause the engine to rapidly speed up as soon as the ignition circuit is restored, the underdrive being automatically effective as will presently be more apparent.

The lever 65 is pivoted at 65A and has rigidly fastened thereto a second lever 73 (Fig. 13) directed forwardly to provide spaced fingers 74, 75 in the path of the actuator 76 of the snap-switch 77 which is a control part of the kickdown mechanism. When pedal 59 moves to the limit of its travel in throttle opening direction, finger 75 throws actuator 76 rearwardly to close switch 77, the switch remaining closed until the pedal 59 is fully released, or substantially so, at which time finger 74 restores actuator 76 to the Fig. 13 position to open the switch 77. The ignition circuit, after interruption during kickdown, is not dependent for restoration on release of the pedal 59 but is restored by other means presently described.

Figure 2:
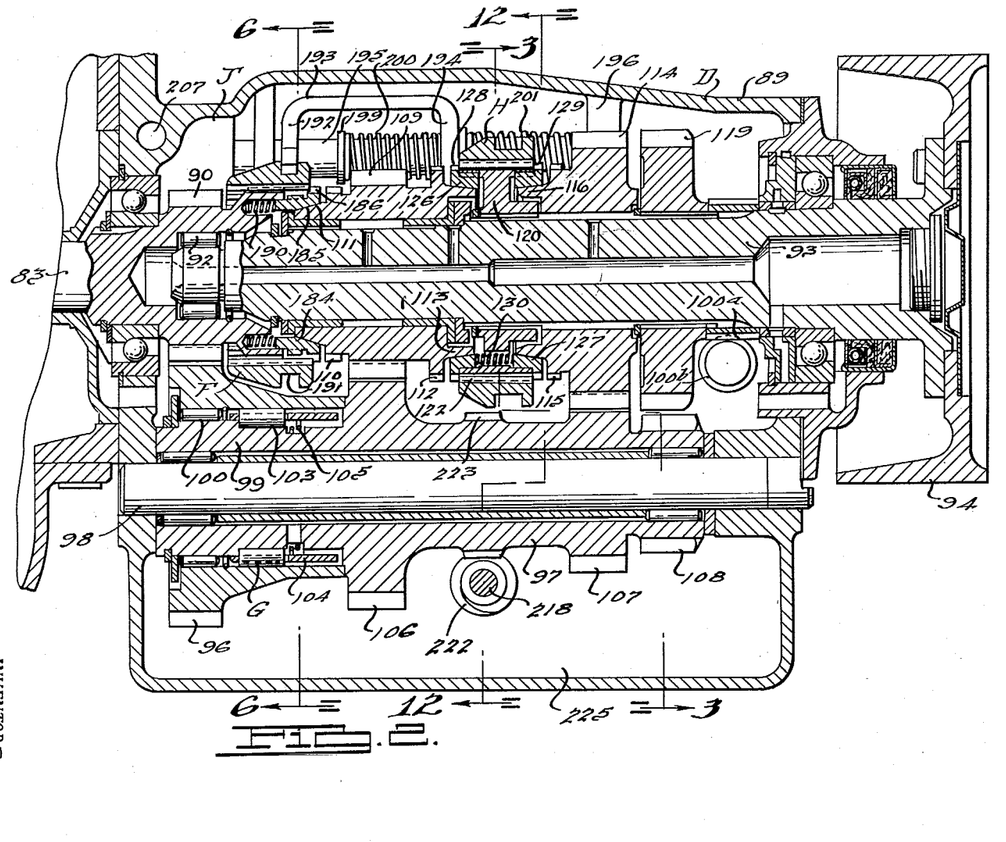
Fig. 2 is a sectional elevational view through the speed ratio changing transmission.

Shaft 83 which receives the drive from the aforesaid engine, fluid coupling, and friction clutch, extends rearwardly into the housing 89 of transmission D (Fig. 2) where it is formed with a main drive pinion 90 and a set of external driving teeth certain of which slidably fit internal clutch teeth of the synchronous coupling clutch sleeve F so that sleeve F turns with transmission driving shaft 83 but may slide rearwardly from its Fig. 2 position relative thereto. Sleeve F comprises one of the positively interengageable drive control elements of the fast speed drive.

Figures 6, 7, 8, 9:
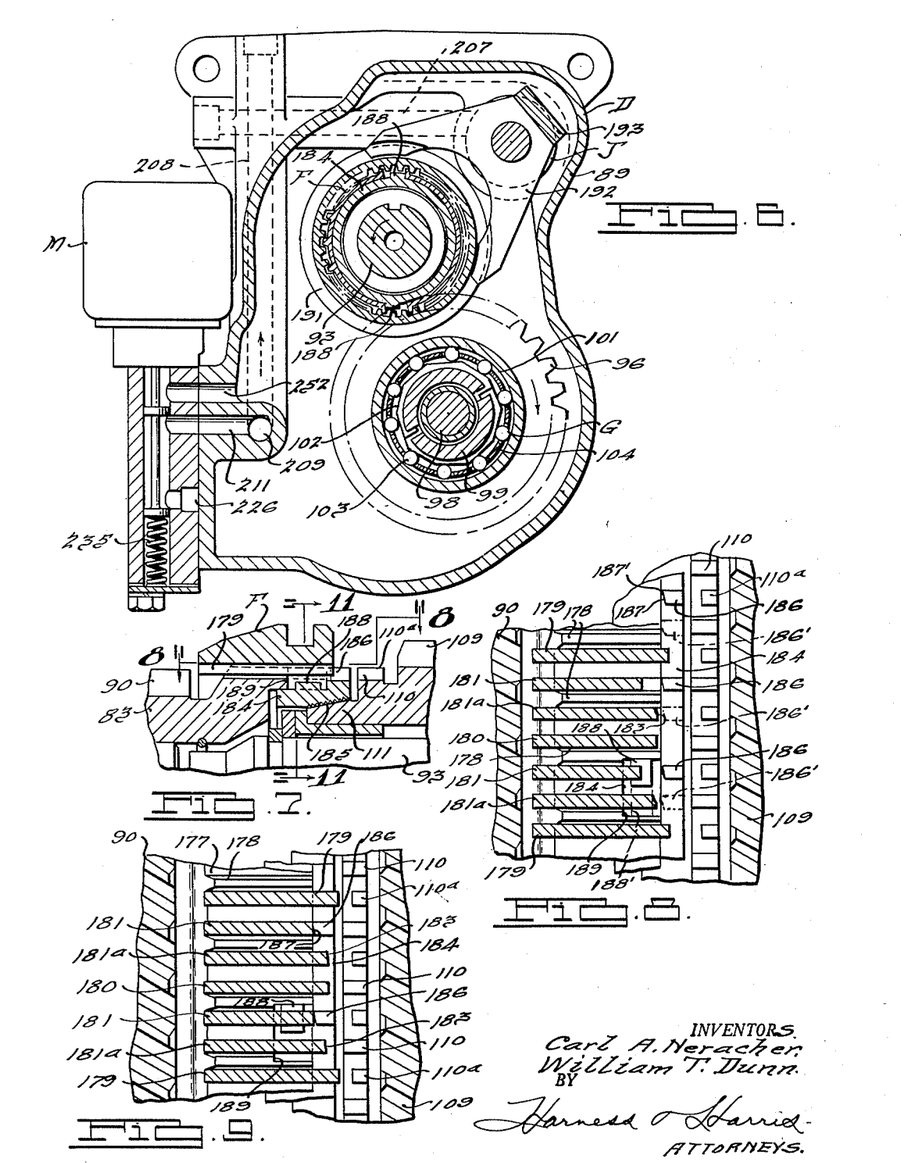
Fig. 6 is a transverse sectional view through the transmission according to line 6—6 of Fig. 2.
Fig. 7 is a detailed enlarged view of the synchronous blocker clutch or coupling mechanism.
Fig. 8 is a sectional plan view illustrated as a development according to line 8—8 of Fig. 7, the automatic clutching sleeve being released.
Fig. 9 is a similar view showing the automatic clutching sleeve in its intermediate blocked position.

The drive pinion 90 is hollow and journals, by a bearing 92, the forward end of the transmission driven structure or shaft 93 which may carry the usual propeller shaft brake drum 94. The drive pinion 90 is continuously meshed with a gear 96 for driving the countershaft cluster 97 rotatable on a countershaft support 98. The cluster 97 has a forward extension 99 journalled at 100 within gear 96 and between these parts 99 and 96 there is provided the automatic release and engaging means for the slow speed drive in the form of an overrunning control device or clutch G (Figs. 2 and 6). The usual speedometer drive gears are shown at 100a fixed to shaft 93 and 100b for driving the speedometer cable.

The clutch G comprises a driving cylinder clutching member 101 formed within gear 96, and an inner driven cammed member 102 formed on extension 99. Rollers 103 are disposed between clutch members 101 and 102 such that these rollers are wedged to clutch these members together when the gear 96 tends to rotate faster than extension 99 in the direction of forward drive of the car while allowing the extension 99 to freely overrun gear 96. Assuming the usual clockwise direction of driving shaft 83, when looking from the front to the rear, then clutch G engages when as viewed in Fig. 6 the gear 96 tends to rotate clockwise faster than extension 99. A cage 104 positions the rollers 103 in proper spacing, a spring 105 yieldingly urging the rollers in the direction of their engagement as is customary in overrunning clutches.

The cluster 97 is further formed with reduction gears 106, 107 and reverse gear 108, these three countershaft gears being of relatively decreasing diameter in the order mentioned. Gear 106 is in constant mesh with a gear 109 which is freely journalled on driven shaft 93. This gear 109 has a forward extension formed with a set of external clutch teeth 110, 110a for positive clutching with sleeve F by interengaging the teeth thereof. The gear 109 has a friction cone clutch member 111 and a rear extension also formed with a set of clutch teeth 112 and friction cone clutch member 113. Teeth 110 are relatively long and alternate with relatively short teeth 110a.

The gear 107 is constantly meshed with a low speed gear 114 freely journalled on driven shaft 93 and having a forward extension likewise formed with clutch teeth 115 and cone clutch member 116. The reverse gear 108 is adapted to mesh with a reverse idler gear 117 (Fig. 3) when the latter is slid forwardly on its countershaft 118. At such time the idler 117 also meshes with a gear 119 fixed on the driven shaft 93.

The arrangement is such that shaft 93 may be selectively clutched at the will of the driver with gears 114 and 109, through a manually shiftable clutch sleeve H the control comprising a suitable manual remote shift. The operation of clutch sleeve F is, on the other hand, automatic in its operation of clutching driving shaft 83 with gear 109 or disconnecting these parts. Rearward shift of the sleeve H into engagement with the gear 114 will establish its low range position. With the sleeve H in this position and the sleeve F disengaged the transmission will be in first speed ratio drive. With the sleeve F engaged second speed ratio drive will be in effect. Forward shift of sleeve H into engagement with the gear 109 will establish its high range position. With the sleeve H in this position and the sleeve F disengaged the transmission will be in third speed ratio drive. With the sleeve F engaged, fourth speed ratio drive (direct) will be in effect.

Fixed to driven shaft 93 is a hub 120 (Figs. 2 and 12) formed with external teeth 121 slidably engaged with the internal teeth 122 of the shiftable clutch sleeve H adapted for forward and rearward shift by a yoke 123 fixed to a longitudinally extending shift rail 124 disposed to one side of shaft 93 adjacent the side opening 125 of casing 89, a second rail 138 being slidably disposed rail 124 for shifting the reverse idler 117 by means of yoke 137 engaging the gear collar 139.

Synchronizing blocker rings 126, 127 are respectively disposed between gears 109, 114 and hub 120 and are driven with hub 120 with slight rotative clearance. These blockers have cammed teeth 128, 129 having a pitch circle the same as that of sleeve teeth 122 and teeth 112 and 115 and they are adapted to frictionally engage the clutching members 113 and 116 respectively. If desired, energizing springs 130 may be provided between the blockers to lightly urge them into engagement with cones 113 and 116 respectively so that the blocker teeth 128, 129 are misaligned with the sleeve teeth 122 thereby preventing shift of sleeve H as long as the parts to be clutched are rotating at different speeds.

When sleeve H is moved forwardly, teeth 122 engage the cammed ends of blocker teeth 128 thereby urging the blocker under pressure engagement with cone 113 to synchronize gear 109 with shaft 93 (the main friction clutch being released during manual shift of sleeve H to facilitate the clutching action). Then the blocker 126 will rotate slightly relative to hub 120 to permit the sleeve teeth 122 to pass through blocker teeth 128 to engage teeth 112 to positively clutch shaft 93 with gear 109. The rearward shift of sleeve H to clutch with teeth 115 of gear 114 is synchronously effected under control of blocker 127 in the same manner.

In order to shift sleeve H with the teeth 115 of the low speed drive gear 114, the operator disengages the main clutch ahead of shaft 83 and then shifts rail 124 and sleeve H rearwardly. The main clutch is then engaged for the low drive. Shift of rail 124 forwardly will slide sleeve H forwardly to clutch with the teeth 112 of the gear 109 to obtain the third speed ratio of the four available forward speeds.

In order to effect the reverse drive, the rail 138 and idler 117 are shifted forwardly into mesh with gears 108 and 119. The main clutch is preferably released to effect manual shifts of sleeve H and reverse idler 117.

Blocking means is provided to limit rearward shift of clutch sleeve F whenever shaft 83 and gear 109 are rotating at different speeds, the blocking action being such that the sleeve F will clutch only when the engine is coasting. The details of the blocking means is best shown in Figs. 7–11, the arrangement providing improved blocker action with ample clearance at the blocker teeth without excess backlash when sleeve F is fully clutched with teeth 110, 110a.

The rear end of shaft 83 beyond pinion 90 is externally toothed, every other tooth being cut away, to provide spaces 177 between driving teeth 178. The clutch sleeve F has internal teeth formed in a repeating pattern best shown in Figs. 8, 9, and 10. Every sixth tooth 179 is relatively long and engages one of the teeth 178. Spaced equally between each pair of adjacent teeth 179 is a tooth 180 also engaging a tooth 178. The teeth 180 are cut back at their rear ends so that they are of somewhat less length than the teeth 179. Between adjacent pairs of teeth 179, 180 are the blocked teeth 181, 181a. These teeth have at least one of their side faces in sliding engagement with a tooth 178. The pairs of teeth 181, 181a are spaced apart to receive the blocker teeth therebetween. The teeth 181a are longer than teeth 181 and their rear ends are preferably cammed or bevelled at 183 so that the high portion of their rear faces forms the advancing portion of these teeth with respect to the forward direction of rotation. Therefore, one tooth 181a of each pair of blocker-engaging teeth 181, 181a extends rearwardly axially beyond the other tooth 181 of such pair so that for convenience of reference teeth 181a may be said to be longer than teeth 181 although obviously the forward ends of teeth 181 and 181a may not be circumferentially aligned.

A blocker synchronizing ring 184 lies between the gears 109 and 90 and comprises a friction cup clutching surface 185 which may be formed as a fine thread or plain if desired, to engage the surface of cone 111 to obtain the blocker action. The blocker ring is formed at its rear end with upstanding blocker teeth 186 having cammed or bevelled forwardly directed end portions 187 (when teeth 181a are bevelled at 183) and flat portions 187a respectively engageable with the cams 183 and flat ends of sleeve teeth 181a and 181. The blocker ring rotates with the driving shaft 83 and sleeve F with relative rotation accommodated so that blocker teeth may move between the solid line and dotted line showing 186' in Fig. 8 at which times the blocker teeth are axially aligned with blocked teeth 181 and 181a respectively.

The blocker ring drive is provided by a plurality of upstanding lugs 188 formed as a part of ring 184. Ordinarily two lugs are sufficient, disposed at diametrically opposite points. The rear edge of the driving shaft is cut or notched at 189 to receive a lug 188 with sufficient clearance circumferentially to allow the blocker teeth 186 to rotate relative to the sleeve teeth within the aforesaid limits. A plurality of light springs 190 may be provided between the driving shaft 83 and blocker ring 184 to urge the blocker surface lightly into frictional engagement with cone 111 so that the blocker ring tends to rotate with gear 109.

From the foregoing it will be apparent that whenever the speeds of shaft 83 and gear 109 are different from each other, the blocker ring 184 will move into position to block rearward shift of sleeve F. In Fig. 8, the sleeve F is in its disengaged forward position, the blocker ring tending to lag behind the driving shaft 83 and sleeve F which is the condition when the gear 109 is rotating slower than the driving shaft and when the sleeve is not urged rearwardly. When gear 109 rotates faster than the driving shaft, as when the engine coasts, then the friction drag at cone 111 drags the blocker ring rotatably forwardly (clockwise looking front to rear) ahead of the driving shaft until the lugs 18 engage the ends of slots 189 opposite to end engaged in the Fig. 8 showing. At this time the blocker teeth are at position 186'. In either instance rearward shift of sleeve F is blocked by the blocker teeth 186.

The arrangement is such that the sleeve teeth 181, 181a will not shift rearwardly of the blocker teeth 186 except when the engine and sleeve are coasting. Therefore, whenever the engine is driving the car and the sleeve F shifts rearwardly, the sleeve will be blocked against ratcheting with teeth 110, 110a. Furthermore, clutching of sleeve F is limited to coasting down of the engine to synchronism with teeth 110, 110a from a condition where the engine and sleeve F were rotating faster than the teeth 110, 110a.

The means for urging sleeve F rearwardly will be presently described. However, let us assume at this time that a force is applied rearwardly to sleeve F while the sleeve is in the Fig. 8 position of release. Several conditions may arise depending on whether the engine is driving or coasting. Let us first assume that sleeve F is urged rearwardly while the engine is driving the car in a reduction drive ratio as when the driving shaft 83 and sleeve F are rotating forwardly faster than gear 109. Under such conditions the blocker 184 will lag sleeve F and the blocker teeth 186 and lugs 188 will be positioned as in Fig. 8 (solid lines). Now as the sleeve F moves rearwardly, the teeth 181 will strike teeth 186 and further shift of the sleeve will be blocked as long as the engine continues to drive in this relationship. This condition is shown in Fig. 9 which may be said to represent an intermediate or blocked position of the sleeve at the time that the sleeve is rotating faster than gear 109. If now the accelerator pedal is released to allow the engine to coast, while gear 109 continues to freely rotate, the sleeve F will rapidly slow down until it synchronizes with gear 109. Then, as the sleeve starts to drop below the speed of gear 109, the blocker 184 will rotate with this gear and the sleeve will lag the blocker by an amount equal to half the total travel of lugs 188 which total travel is from the solid line position to the dotted position 188' of Fig. 8. The half travel is indicated by the position of lugs 188 in Fig. 10. This is necessarily so because of the long teeth 181a the rear ends of which (Fig. 9) axially overlap the blocker teeth 186 so that the sleeve lags only until these teeth 181a strike the sides of the blocker teeth at this approximately synchronized condition between the sleeve F and gear 109. As soon as this condition is reached the sleeve F moves rearwardly so that the blocker teeth 186 pass between adjacent teeth 181, 181a and the long teeth 179 will each enter a space between the long teeth 110 so as to glance off a short tooth 110a. The short teeth 110a in conjunction with long teeth 179 insures initial clutching of the sleeve F and gear 109 on the coast and furthermore provides for an initial clutching without shock, jar or damage to the clutching parts or other parts of the car mechanism; the engagement is also so smooth as not to jolt the car occupants. Thus, the long teeth 179 are caught between pairs of adjacent long teeth 110 for initial clutching and short teeth 110a afford additional drive contact with the sleeve when fully clutched (Fig. 10) and also serve to cushion the initial clutching inasmuch as they limit teeth 179 from entering too far between teeth 110 during the initial clutching action. As the long teeth 179 glance off the teeth 110a, the engine coasts down slightly more until the teeth 179 strike against the sides of teeth 110a and at this time the engine cannot coast down any more relative to gear 109. Any continued coast of the engine will simply serve as a brake on the car travel or in other words the engine cannot then slow down except as permitted by the car slowing down with it. During such further coast the drive friction from teeth 110 to teeth 179 will ordinarily prevent the full or secondary clutching movement of sleeve F as the force applied to shift sleeve F is ordinarily by preference not sufficient to overcome this friction but the next time the torque is reversed between sleeve F and gear 109, as when the engine is speeded up to take over the drive, then the sleeve will instantly shift fully rearwardly to the Fig. 10 position. As the torque changes from coast to drive, the teeth 179 cannot jump ahead beyond a short tooth 110ª because of the impressed rearward force on sleeve F which will shift the sleeve the instant the sleeve teeth are unloaded and also because on coast, the teeth 179 will enter a slight distance between a pair of teeth 110, 110ª before further rearward movement of sleeve F is prevented by the coast friction between teeth 110 and blocker teeth 186. If, during the coast when blocker teeth 186 first enter the spaces between teeth 181, 181ª, the teeth 179 strike the ends of teeth 110, then the sleeve will slide off these teeth 110, glance off teeth 110ª, and engage the sides of the next teeth 110 for the initial clutching. The long teeth 179 will in any event insure clutching on coast between the sleeve F and gear 109 at approximately a condition of synchronism between these parts.

Figure 10:
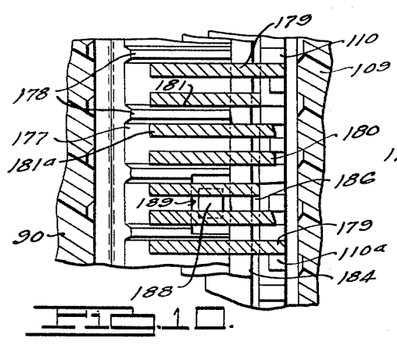
Fig. 10 is a similar view showing the parts in full clutching engagement.
Figure 11:
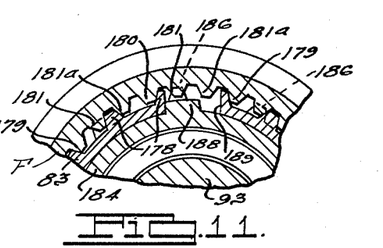
Fig. 11 is a transverse sectional view taken as indicated by line 11—11 of Fig. 7.

From the foregoing it will be apparent that the long teeth 179 function as primary engaging teeth and the teeth 180, 181ª function as secondary engaging teeth in that initial clutching is effected first of all by engagement of the primary teeth 179 with the longer teeth 110 of gear 109 followed by engagement of the pairs of secondary teeth 180, 181ª with the teeth of this gear as in Fig. 10. Here again, for convenience of reference, teeth 110, 110ª may be respectively designated as long and short teeth to conveniently define their difference in lengths radially in the direction of the driving shaft 83.

Now let us assume that the force applied rearwardly to sleeve F occurs at a time when the sleeve lags the blocker. Now, with the sleeve teeth 181ª blocked by the blocker teeth at positions 186', as when the engine is coasting, let us assume that the engine is speeded up. This will cause the sleeve to rotate ahead of the blocker until lugs 188 engage the following ends of slots 189 as in Fig. 8 and the sleeve will move rearwardly until the parts are positioned as in Fig. 9 with teeth 181 blocked by teeth 186. The function of the short teeth 181 relative to long teeth 181ª will now be apparent because as the sleeve F moves ahead of the blocker, teeth 181ª slide off the ends of teeth 186 but the blocker teeth do not have time to enter the spaces between teeth 181, 181ª but instead, the blocker teeth jump these spaces and block teeth 181 which are made sufficiently shorter than teeth 181ª to insure this action. When the parts assume the Fig. 9 positions, then on slowing down the engine the clutching of sleeve F will occur during the coast just as in the foregoing example of a typical clutching of the sleeve.

The automatic control for shifting sleeve F will now be described. This sleeve has a shifting groove 191 engaged by a shift yoke 192 which extends upwardly and outwardly (Figs. 4, 6 and 12) in the casing 89 and then rearwardly in the form of a bar 193 the end of which is bent inwardly at shoulder 194 to slidably receive a shift rod 195. This rod extends longitudinally of the transmission and is guided for reciprocation in the casing brackets 196, 197. The rod also slidably projects through yoke 192. Between shoulder 194 and yoke 192 the rod 195 is grooved at 198 to receive an abutment snap ring 199, a compression spring 200 acting between this ring and the yoke shoulder 194. A stronger spring 201 acts between the fixed bracket 196 and a second abutment ring 202 fixed to rod 195 rearwardly adjacent the yoke shoulder 194 and serving to yieldably thrust the rod together with the yoke and sleeve F forwardly to the Fig. 2 position. Rearward movement of rod 195 is limited by an abutment 203 engaging bracket 197, the rod being capable of rearward movement in advance of rearward shift of sleeve F.

Rearward shift of rod 195 is effected by some form of energizable servo-motor as, for example, a pressure fluid motor J (Fig. 4) comprising a cylinder 204 slidably receiving a piston 205 engaged by the forward end of rod 195. A cylinder head 205 limits forward movement of the piston and rod under the action of spring 201. Pressure fluid, preferably oil, is admitted to the cylinder between head 206 and piston 205 through the communicating delivery passages 207, 208 (Figs. 6, 13).

Figure 13:
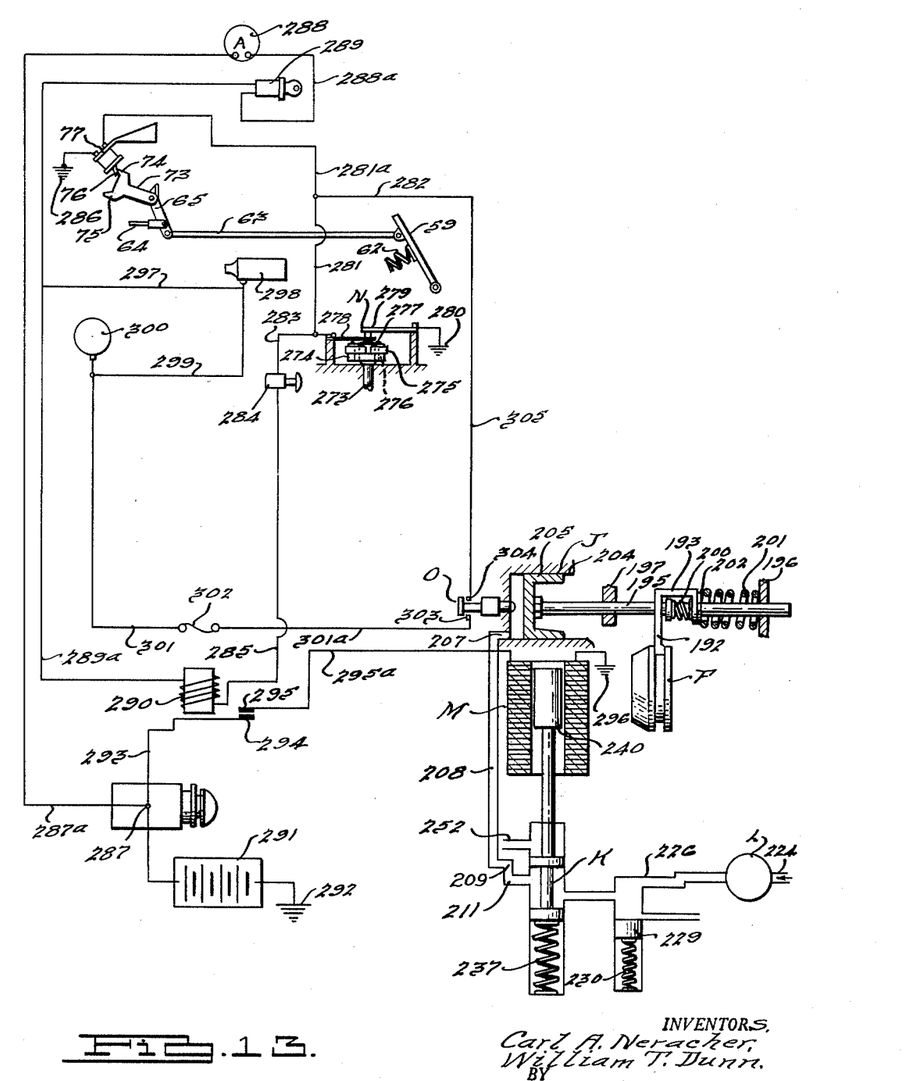
Fig. 13 is a diagrammatic view of the transmission control system.

The passage 207 extends transversely across the transmission while passage 208 extends downwardly and then rearwardly through a horizontal branch passage 209 (Figs. 6 and 13). The latter passage then branches laterally outwardly at 211 to receive oil under pressure from the valve K when in the position shown.

The oil pressure is developed by a pumping means comprising a pump L (Figs. 12, 13) having its driving member secured to a shaft 218. The inner end of shaft 218 carries a gear 222 meshing with a pump drive gear 223 of the countershaft 97.

The pump intake receives a constant supply of oil by an inlet passage 224 which opens to the oil reservoir or sump 225 along the bottom of the transmission casing. The oil under pressure is delivered from the pump forwardly to valve K through the passage 226. The passage 226 also communicates with the pressure relief valve 229 urged upwardly by a spring 230. Prior to oil delivery to motor J a spring 237 urges valve K upwardly thereby raising the armature plunger 240 of a solenoid M. In this position of the parts, the oil under pressure from pump L is delivered by passage 226 into the valve chamber and thence to the aforesaid passage branch 211 for supply through passages 209, 208, and 207 to motor J for forcing piston 205 and rod 195 rearwardly. When the solenoid 17 is energized then the plunger 240 is thrust downwardly thereby forcing valve K downwardly against spring 237 to deenergize motor J by opening passage 211 to vent drain 252 and at the same time preventing the oil supply passage 226 from communicating with the passage 211.

Whenever the car is being driven, the countershaft 97 is drivingly connected with the driven shaft 93 and this relationship is conveniently utilized for controlling the automatic operation of sleeve F as a function of car speed in the following manner.

Figure 12:
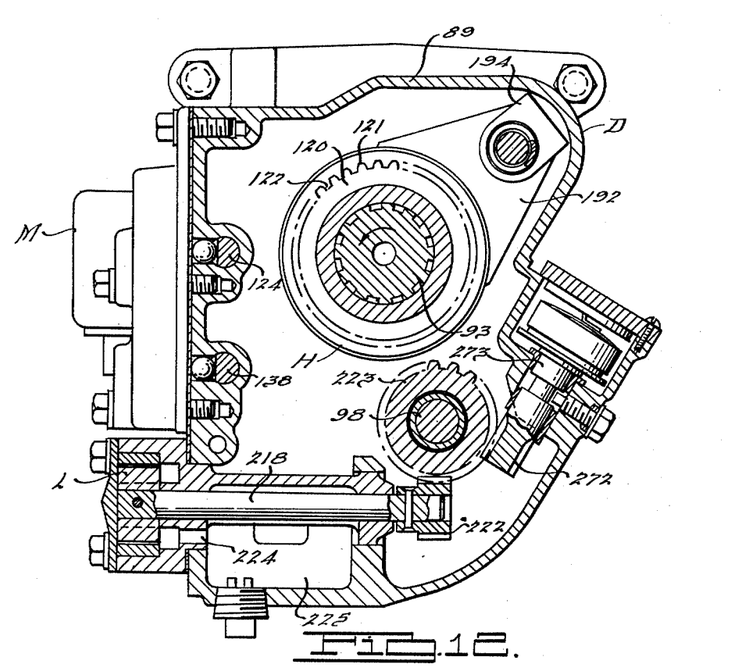
Fig. 12 is a transverse sectional view through the transmission as indicated by line 12—12 of Fig. 2.

Referring to Figs. 12 and 13 the pump drive gear 223 drives a gear 272 having a shaft portion 273 which operates a governor switch N of any suitable type. In Fig. 13 the shaft 273 has a head 274 which carries a pair of weights 275 eccentrically mounted by pins 276. The weights are connected by a flexible flat metal member 277 which is normally bowed upwardly (when shaft 273 is rotating below a predetermined speed) to spring the electrical contact 278 into engagement with fixed contact 279 which is grounded at 280. Thus when the car is standing still or when shaft 273 is rotating below a predetermined critical speed, the wire 281 for contact 278 is grounded through engagement of the switch parts 278, 279. When shaft 273 exceeds its critical speed, which may be varied as desired by the arrangement of weights 275 and spring 277, the weights 275 rotate about pins 276 sufficiently to flex the spring 277 downwardly whereupon contact 278 flexes down enough to open the switch by moving out of contact with switch piece 279.

The wire 281 has the branch conducting wires 282, 283. The wire 283 contacts a dash mounted manually operated switch 284, the circuit continuing from this switch through wire 285 to a relay. This switch 284 is normally closed and is preferably used only in emergencies so that the engine may be started by towing the car without encountering a free wheeling condition.

The wire 281 then continues at 281ª to the kickdown switch 77 which has its other terminal grounded at 286. The usual starter terminal 287 has a lead 287ª to the ammeter 288 the circuit continuing by wire 288ª to the usual ignition switch 289 and extends through primary wire 289ª of the horn and solenoid relay 290, this wire then continuing at 285 to the switch 284.

The terminal 287 is connected to the usual storage battery 291 the other terminal of which is grounded at 292. The terminal 287 also leads through wire 293 to relay movable contact piece 294. The other relay contact piece 295 is connected by conductor 295ª to the solenoid M which is then grounded at 296.

The lead 297 extends from wire 289ª to coil 298 and thence through lead 299 to the engine ignition distributor 300. From the distributor a wire 301 extends through a safety fuse 302 and wire 301ª to a terminal 303 of a pressure fluid operated switch O, having its other terminal 304 connected by wire 305 to the wire 282.

From the foregoing wiring diagram it will be apparent that several circuits are formed.

The kickdown relay circuit which is closed by kickdown switch 77 and grounded by governor switch N at low speeds for operating the solenoid M comprises ground 286, switch 77, leads 281ª, 281 and 283, switch 284 and wire 285 to relay 290 thence as before through switch 289, ammeter 288, terminal 287, battery 291 and ground 292. At low speeds, instead of this circuit being grounded at 286 through the kickdown switch 77, the ground 280 completes the relay circuit through governor switch N to wire 283, switch 284, wire 285 and relay 290. The aforesaid main solenoid circuit comes into action by either the switch 77 or switch N.

The kickdown ignition circuit which grounds the ignition current after oil pressure is vented at hydraulic switch O and the kickdown switch 77 is closed, comprises ground 286, switch 77 and leads 281ª, 282, 305 to switch O, thence through wire 301ª and fuse 302 to distributor 300, 299 to coil 298, lead 297 and through the switch 289, ammeter 288, terminal 287, battery 291 and ground 292.

The switch O (Figs. 4, 5, and 13) comprises a casing 306 formed with a forward neck 307 threaded for mounting on the head 206. The casing contains the insulating body 308 carrying terminals 303, 304. The terminal 303 has a relatively fixed contact piece 309 and terminal 304 has a movable contact piece 310 carried by a flat flexible spring conductor 311 yieldingly urged outwardly by a spring 312 tending to engage contacts 309, 310 and thereby close the switch.

The switch is normally maintained open by either of two means, viz., the pressure fluid in cylinder 204 or by the piston 205 when in the end of its forward stroke as in Figs. 12 and 13. As will presently be apparent, the engine ignition system may function normally when the switch is open but is momentarily grounded during the time that this switch is closed to cause a reversal of torque through the engine to thereby facilitate kickdown movement of sleeve F. In this manner the normal power delivery of the engine is momentarily interrupted. However, the fluid operated switch O is in series with the kickdown switch 77 so that the ignition is not interrupted until both of these switches are closed.

The switch O is opened by a ball 313 urged forwardly against conductor 311 by a flexible spring diaphragm 314 engaged by a yieldable bumper 315 slidably guided in a plunger 316 which has a flange 317 seated on a wall bounding the fluid chamber 318. A spring 319 acts between bumper 315 and plunger 316 urging the plunger to seat, at which time the rear plunger end projects rearwardly of head 206 and in the path of piston 205 as at 316'. When the plunger 316 is seated, fluid may pass between chamber 318 and cylinder 204 by way of the grooved passages 320, 321.

Figures 4, 5:
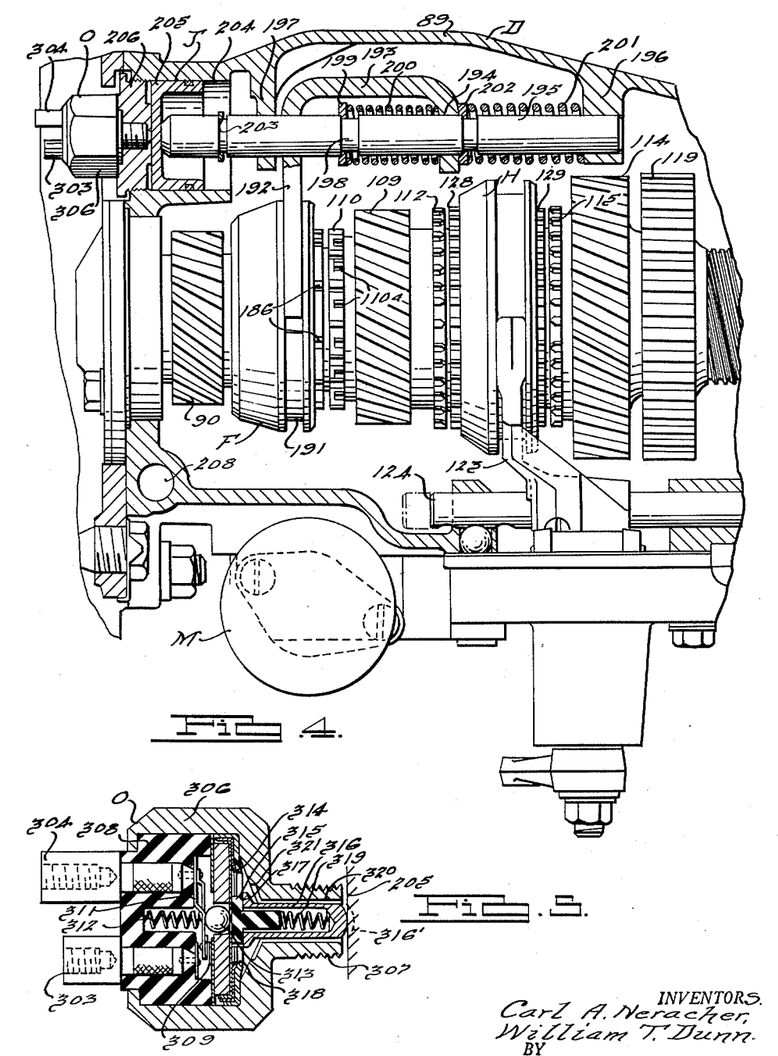
Fig. 4 is a sectional plan view taken as indicated by line 4—4 of Fig. 3.
Fig. 5 is a sectional view through the pressure fluid controlled switch.

In the Fig. 5 position, the piston 205 is held forwardly against head 206 by the heavy spring 201 thereby forcing plunger 316 forwardly against bumper 315. This action forces the diaphragm to move the ball 313 forwardly so that conductor 311 is flexed against spring 312 to open the switch, viz., contact 310 disengaged from contact 311. Now if pressure fluid is introduced to cylinder 204 to energize the motor J, then piston 205 will move forwardly permitting plunger 316 to seat while still maintaining the switch O in its open condition. The fluid enters chamber 318, by the grooves 320 and the pressure holds the diaphragm flexed forwardly while spring 319 moves plunger 316 rearwardly until it seats at flange 317. This rearward movement of piston 205 effects clutching of sleeve F without interrupting the engine ignition. If now, the pressure of the fluid is relieved at cylinder 204, as by closing the kickdown switch 77, the chamber 318 is immediately vented by grooves 321, 320 and spring 312 acts to close the switch at contacts 310, 309. Diaphragm 314 flexes rearwardly against the action of spring 319 to unload ball 313.

Therefore, as soon as the pressure fluid is relieved at the motor J, the switch O is closed to interrupt the engine ignition by grounding the same. This interruption is only momentary because, as soon as the pressure is relieved in cylinder 204 and the ignition is interrupted, then spring 201 is free to force rod 195, piston 205 and yoke 192 all forwardly as a unit, the sleeve F moving forwardly away from engagement with clutch teeth 110, 110ª because the torque reversal unloads the teeth 110, 110ª and the teeth of sleeve F engaged therewith. When the piston 205 nears the end of its forward stroke it engages the plunger end at position 316' and restores the parts to their Fig. 5 position opening switch O and thereby restoring the engine ignition even though the kickdown switch 77 is thereafter maintained closed. As a matter of fact the arrangement is, as aforesaid, preferably such that switch 77 is not opened until approximately full release of the accelerator pedal 59 when finger 74 snaps the switch open by the actuator 76.

The operation of the power transmission is as follows.

With the car parked, the transmission D will of course be in neutral, with the manually shiftable sleeve H and the automatically shiftable sleeve F positioned as in Fig. 2. The ignition is off at switch 289 and the solenoid M is deenergized, the valving K being raised as in Fig. 6.

The engine is normally started with the transmission in neutral. As soon as the ignition switch 289 is closed, preparatory to starting the engine, the solenoid M will be energized, causing the valve K to move downwardly for venting the motor J by establishing communication between delivery passage 211 and vent 252. It may also be noted that at this time the governor switch N is closed as in Fig. 13. The coupling sleeve F remains in its forward released Fig. 2 position. When the engine starts, the forward rotation of the crankshaft thereof (not shown) drives the input shaft 83 and pinion 90 through the fluid coupling and the main clutch thereby driving countershaft 97 in its normal backward rotation through the overrunning clutch G to drive pump L. For convenience, any part may be said to have forward rotation when it turns clockwise looking front to rear. With the pump operating, pressure fluid is delivered to passage 226.

To start in the lowest or slowest driving speed ratio, ordinarily called first, the driver depresses the usual clutch pedal to release the main clutch and then shifts the manual sleeve H rearwardly for blocker synchronizing clutching with the teeth 115 of the low speed gear 114. This shift is facilitated by release of the main clutch thereby disconnecting the pinion 90 from the engine A and fluid coupling.

The driver then releases the clutch pedal to engage the main clutch while depressing the accelerator pedal 59 to start the car in first. The drive in first is obtained as follows: pinion 90 drives gear 96 which causes engagement of overrunning clutch G to drive countershaft 97, gear 107 driving gear 114 whence the drive passes through sleeve H and hub 120 to the output shaft 93.

In the event that the car is accelerated in first to a speed sufficient to cause governor switch N to open, thereby deenergizing solenoid M and causing pressure fluid delivery to motor J, the sleeve F will be prevented from shifting rearwardly beyond the Fig. 9 position because the blocker 184 will lag behind the sleeve in blocking position (Fig. 9).

In order to facilitate a discussion of the control functions, we will assume that the governor switch N is so arranged in relation to particular car and transmission illustrated, that this switch will open when the car is driven in first at 7.5 m.p.h. (miles per hour). Obviously this may be varied as desired but is believed to be an approximately desired condition. Because of the friction lag effect inherent in devices of this character, the governor switch N will close, when its drive shaft 273 slows down from above the aforesaid critical speed of opening, at a corresponding car speed slightly below the assumed 7.5 m.p.h. but for convenience of discussion this lag effect may be ignored. Furthermore, if desired, any well known form of detent means may be employed to control the operating functions of the governor.

The drive in first is a free-wheeling drive below 7.5 m.p.h. car speed because within such limits the governor switch N remains closed and solenoid M is thereby energized to maintain motor J vented, the driven shaft 93 being free to overrun the driving shaft 83 by automatic release of the overrunning clutch G.

When the car is driven above 7.5 m.p.h. in first, this being the normal operation of the car and being one reason for setting the critical speed of the governor switch N at the assumed low car speed, the governor switch N opens thereby deenergizing the solenoid whereupon the valving K moves to the Fig. 6 position. This causes the delivery of pressure fluid to motor J whereupon piston 205 and rod 195 move rearwardly compressing springs 201 and 200. The sleeve F will move from the Fig. 8 position to the Fig. 9 intermediate or blocked position whereupon the blocker 184 prevents further rearward shift of the sleeve. It may also be noted that the fluid switch O remains open after piston 205 moves rearwardly by reason of the fluid pressure in chamber 318 (Fig. 5).

While a car is being driven under the foregoing conditions above 7.5 m.p.h. in first, the shift from first to second is automatic and operates in response to driver release of the accelerator pedal 59 sufficiently to slow down the engine speed to the point where the blocker 184 will release the sleeve F. This is most conveniently accomplished by simply letting up on the accelerator pedal whereupon the speed of the engine quickly drops while the car maintains its speed by reason of overrun at clutch G. As the pinion 90 drops to the speed of gear 109, the sleeve F while urged rearwardly by spring 200 begins to fall behind the speed of the blocker 184 which is rotating at the speed of gear 109 and teeth 181a strike against the blocker teeth 186 to align the blocker teeth with the spaces between teeth 181, 181a whereupon the sleeve will shift rearwardly without shock or jar to initially clutch with the teeth 110, 110a during coast and thereby initially clutch the driving shaft 83 with gear 109 for the second speed drive faster than the aforesaid drive in first. The sleeve F will fully shift rearward to the Fig. 10 position when the driving shaft is next speeded up. Sleeve F therefore clutches during coast and under pressure of the fluid transmitted through the medium of spring 200 which cushions the clutching and greatly increases the life of the clutch teeth. Furthermore, motor J operates to hold or maintain sleeve F engaged as long as the motor remains energized.

The drive in second passes from pinion 90 through sleeve F to gear 109 thence to gear 106, countershaft 97, gears 107 and 114, sleeve H, hub 120 and the driven shaft 93. This drive is a two-way drive, clutch G overrunning, and is maintained by the oil pressure at motor J which holds rod 195 and sleeve F rearwardly. The engine is used as a brake during coast in the second speed ratio, the car driving the engine at approximately twice the speed of the driven shaft 93 for the particular gear sizes illustrated.

Coasting in the second speed below 7.5 m.p.h. causes the governor switch N to close thereby energizing the solenoid M and adjusting the valving K for venting motor J. However, as the teeth of sleeve F are loaded at teeth 110, 110a during coast, the sleeve will not move forwardly to its released position until the torque through the transmission is reversed by depressing the accelerator pedal to cause the engine to drive the car. When this takes place, spring 201 acts to move rod 195 and sleeve F forwardly as a unit back to the Fig. 4 position so that car acceleration under such conditions will automatically take place in the first speed ratio. Of course, if the car coast in second does not go below 7.5 m.p.h. then the governor switch N remains open and acceleration of the car will then take place in second without shifting back to low. Incidentally it is noted that the functioning of the governor switch N is the same in second as in first because the countershaft 97 is coupled with the driven shaft 93 through the same gears 107, 114 and sleeve H.

Assuming that the car is travelling below 7.5 m.p.h. in first so that the governor switch N is closed to energize solenoid M. The driver depresses clutch pedal to release the main clutch and he then shifts sleeve H to move forwardly under blocker synchronizing shift to clutch with teeth 112 of gear 109 whereby this gear is directly drivingly connected with driven shaft 93 through sleeve H and hub 120. The driver then releases the clutch pedal and depresses the accelerator pedal to drive the car in the third dspeed ratio. The sleeve F will remain released because the governor switch maintains the solenoid energized. The drive in third takes place from the main pinion 90 to gear 96 thence through the overrunning clutch G and through gears 106, 109 and directly out to the driven shaft 93.

If, on the other hand, the car is travelling above 7.5 m.p.h. in second then the governor switch N remains open and the solenoid is deenergized to maintain the valving K vented so that pressure fluid is supplied to motor J holding sleeve F clutched rearwardly. In shifting to the high range under these conditions, the driver depresses the clutch pedal and then shifts to the high range to clutch sleeve H with gear 109 and under these conditions the shift will be made to fourth or direct.

The illustrated gears are of such sizes so that in the third speed, the critical speed of governor switch is roughly 15 m.p.h. car speed instead of 7.5 m.p.h. as in first and second. The critical speed of the governor shaft relative to its drive shaft 273 will, of course, always remain the same. Therefore the drive in the third speed below 15 m.p.h. is accompanied by free wheeling accommodated by the overrunning clutch G. Under these conditions the governor switch N remains closed to energize the solenoid M and the sleeve F remains disengaged.

When driving in the third speed above 15 m.p.h. the governor switch N is open to de-energize the solenoid and direct drive will automatically be obtained when the accelerator pedal is released for accommodating synchronous clutching of sleeve F. Under such conditions there is no free wheeling in the ordinary sense, the overrunning clutch G allowing the engine and shaft 83 to drop to the speed of gear 109 whereupon clutch F will engage teeth 110, 110a as before.

The shift from third to direct is therefore automatic and is obtained by releasing the accelerator pedal momentarily while driving the car above 15 m.p.h. At the synchronizing point, the blocker 184 will allow the sleeve F to clutch with teeth 110, 110ᵃ under pressure fluid of motor J acting through spring 200 as before, the motor acting to hold sleeve F engaged.

The direct drive is a two-way drive and passes from pinion 90 directly to gear 109 through sleeve F, thence directly to shaft 93 through sleeve H. If the car is allowed to coast below 15 m.p.h. to cause the governor switch N to close and energize solenoid M, then when the accelerator pedal is depressed to unload the teeth of sleeve F this sleeve will shift forwardly providing the drive in third speed.

If desired, the car may be started from rest in third by releasing the main clutch and shifting clutch H forwardly to the high range. The solenoid M remains energized by governor switch N and on releasing the clutch pedal and depressing the accelerator pedal 59, the blocker 184 will lag behind the sleeve F preventing its shift rearwardly when the car is accelerated in third above the speed at which the governor switch N opens, viz., above 15 m.p.h. Direct drive will then result from releasing the accelerator pedal to synchronize sleeve F with gear 109 as before.

The kickdown control functions to stepdown the drive from direct to third or from second to first depending on the setting of the manual shift sleeve H.

Assuming that the car is driving in direct above the critical speed of the governor switch N, viz., above 15 m.p.h. then the driver may obtain third by fully depressing the accelerator pedal. The kickdown switch 77 is thereby closed to energize solenoid M and operate valving K for venting the motor J. As soon as the pressure fluid is released at the motor, the fluid switch O closes and with switches 77 and O both closed the engine ignition is grounded thereby effecting a reversal of torque through the transmission as the car now drives the engine. The cylinder 204 being vented and the teeth of sleeve F being unloaded from their immediately preceding condition of driving teeth 110, the spring 201 operates to move the piston 205 and sleeve F forwardly to the Fig. 4 position. As the piston approaches the end of its forward stroke, it engages plunger end 316' and moves the plunger 316 forwardly to open the fluid switch O and thus restore the engine ignition to normal driving operation under the open throttle condition maintained by the fully depressed accelerator pedal 59. The engine rapidly speeds up to engage the overrunning clutch G and the car is then driven in the third speed. This whole cycle of kickdown takes place very rapidly and smoothly and is entirely responsive to the natural movement of the accelerator pedal downwardly as far as it will go. The kickdown is conveniently used for faster car accelerating driving for rapidly passing another car, in obtaining more favorable torque multiplication for hill climbing, etc. When the accelerator pedal is released, then the direct drive is automatically synchronously obtained. By preference, the direct drive is not restored after kickdown until the accelerator pedal is substantially fully released, as when finger 74 operates switch arm 76. This prevents undesired operations of the kickdown mechanism and changes in the speed ratio within a narrow range of accelerator pedal movement. Therefore the kickdown switch 77 when closed maintains the solenoid M energized and the valving vented until the accelerator is approximately fully released.

When driving the car in the second speed ratio above 7.5 m.p.h., the accelerator pedal may be fully depressed for kickdown to effect release of the sleeve F and a drive in first as will be readily understood from the description of the kickdown from fourth to third. Likewise, the second speed is restored upon release of the accelerator pedal.

In order to drive the car in reverse, the driver releases the main clutch and shifts from neutral to mesh the reverse idler gear 117 with the gears 108 and 119. This reverse drive passes from pinion 90 to gear 96, then through overrunning clutch G and gears 108, 117, 119 to the driven shaft 93. The reverse drive is therefore a free wheeling drive and is illustrated as being of a ratio such that the governor switch N will open at less than 6 m.p.h. car speed to deenergize the solenoid M and effect synchronous clutching of sleeve F with teeth 110, 110ᵃ in response to release of the accelerator pedal. If the driver manipulates the reverse drive in this manner then a step-up in reverse is obtained without free wheeling. Such a drive passes through the following parts: pinion 90 through sleeve F to gear 109 thence to gear 106 and through the reverse gear set 108, 117, 119 to the driven shaft 93.

In general it may be noted that the governor switch N automatically directs the shift from fourth or second into third or first when the car slows down somewhat below the opening speed of the governor switch due to the aforesaid friction lag effect, energizing the solenoid M for venting motor J whereby spring 201 disengages the sleeve F under light coasting torque. This provides a step-down to a slower transmission speed automatically on coast down in direct or second for rapid starting in third or first without releasing the main clutch and with the fluid coupling advantageously contributing to the accelerating characteristics for the car.

The governor switch N in conjunction with the hydraulic switch O functions to prevent interruption of the engine ignition system, by kick-down operation of switch 77, below a vehicle speed where the engine might have a tendency to stall. Where a fluid coupling is employed, there is a tendency for the engine to stall if the ignition is momentarily interrupted at low speed. With our arrangement, stalling tendency is prevented because at low speed the governor switch N closes to energize solenoid M thereby causing piston 205 to open hydraulic switch O. As the latter switch is in series with switch 77 in the kick-down ignition interrupting circuit, operation of switch 77 at low speed will not close this circuit and stalling is prevented.

The governor switch N furthermore acts to prevent the car from tending to get into a locked-up condition as when, for example, without the governor the car is driven into an obstacle such as a wall under drive load with the sleeve F engaged and the usual car bumpers applying backward loading on the car. The sleeve would still be loaded, thereby preventing shifting the transmission out of the forward drive condition at sleeve H. Forward drive of the car is, of course, impossible under these conditions as the transmission would be locked up within itself. However, we have found in actual practice that even without the governor switch N will release by the engine unloading the sleeve teeth accommodated by slight movement of the parts of overrunning clutch G under the aforesaid conditions. However, the governor switch N serves to more rapidly vent motor J than would be the case where the pump L is simply stopped and its use is therefore preferred.

It will be noted that the automatic stepup provided by the drive control element or sleeve F has functions which are substantially the same in each of two ranges of setting for the sleeve H. Thus in each range there is provided a relatively slow speed drive (first or third) and a coast stepup accommodated by the overrunning control device G to a relatively fast speed drive (second or fourth), the device G automatically making the slow speed drive effective merely by release of the positively interengageable drive control elements F and 110. Furthermore, the motor J is energized to engage the positive elements and hold them in engaged relationship until the motor is deenergized by venting the fluid at the motor.

We do not limit our invention in the broader aspects thereof to any particular combination and arrangement of parts such as shown and described for illustrative purposes since various modifications will be apparent from the teachings of our invention and scope thereof as defined in the appended claims.

We claim:

1. In a power transmission for driving a motor vehicle having an internal combustion engine provided with an ignition system and driver operable engine throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including interengaging drive control elements operatively associated therewith and adapted when engaged to establish said fast speed drive, said elements when engaged being subjected to thrust transmission during said relatively fast speed drive so as to resist de-engagement of said elements to release this drive until the torque delivery of the driving shaft is momentarily interrupted, said relatively slow speed driving means including a control device operating automatically to establish this drive in response to release of said relatively fast speed driving means, means for biasing said interengaging elements to establish said relatively slow speed drive, motor means for moving and holding said interengaging elements into engaging relation for establishing said fast speed drive, means responsive to the speed of the vehicle for energizing said motor means, and means operated by said throttle control for momentarily interrupting the engine ignition system to interrupt the torque drive on said driving shaft and operatively deenergizing said motor to permit the establishment of said relatively slow speed drive independently of said speed responsive means.

2. In a power transmission for driving a motor vehicle, a driving shaft adapted to receive a drive from the engine, and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said elements when engaged being subjected to thrust transmission during said relatively fast speed drive so as to resist disengagement of said elements to release this drive until the torque delivery of the driving shaft is interrupted, means biasing said interengaging elements to disengaged relation to establish said relatively slow speed drive, motor means for moving and holding said interengaging elements into engaging relation for establishing said fast speed drive, means responsive to the speed of the vehicle for energizing said motor means, and driver control means operable for operatively deenergizing said motor means and for momentarily interrupting the torque drive of the driving shaft to effect disengagement of said elements independently of said speed responsive means.

3. In a power transmission for driving a motor vehicle having an internal combustion engine provided with an electrical ignition circuit and a driver manipulated throttle control, a driving shaft adapted to receive a drive from the engine, and a driven shaft adapted to drive the vehicle, relatively slow speed driving means for driving the driven shaft from the driving shaft, relatively fast speed drive means for driving the driven shaft from the driving shaft at a speed greater than said slow speed driving means and including positively interengaging drive control elements operatively associated therewith and adapted when engaged to establish said fast speed drive, said elements when engaged being subjected to a thrust transmission during said relatively fast speed drive so as to resist disengagement of said elements to release the drive until the torque delivery of the driving shaft is interrupted, said relatively slow speed driving means including a control device operating automatically to establish this drive in response to release of said relatively fast speed driving means, means for biasing said interengaging elements to disengaging relation to establish said relatively slow speed drive, motor means for moving and holding said interengaging elements into engaging relation for establishing said fast speed drive, means responsive to the speed of the vehicle for energizing said motor means, and driver operating control means for operatively deenergizing said motor means and momentarily interrupting said engine ignition system to interrupt the delivery torque of the driving shaft for effecting a release of said interengaging elements independently of said speed responsive means.

4. In a power transmission for driving a vehicle having an engine provided with a throttle valve; driver operated means for adjusting the engine throttle valve; a rotatable driving structure adapted to receive from the engine; a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a motor operable to control shift of said shiftable member; motion transmitting means between the motor and said shiftable member so constructed and arranged that the motor may operate prior to drive-establishing shift of said shiftable member as aforesaid; and means operable in response to driver operation of said throttle valve adjusting means for controlling operation of said motor.

5. In a power transmission for driving a vehicle having an engine of the type equipped with an ignition system; a transmission drive-controlling element operable from a first position to a second operative positive for effecting a change in the transmission drive; a pressure differential operated motor operable to control operation of said element from its said first position to its said second position and adapted to be vented and thereby rendered inoperative whereby to accommodate return of said element to its said first position; means urging said return of said element when said motor is vented; a control member adapted for operation from a first position to a second position thereof; means operating automatically in response to operation of said control element to its said second position for effecting venting of said motor and an interruption of said ignition system; and means acting to restore said ignition system for normal operation as an incident to said return of said element.

6. In a power transmission for driving a vehicle having an engine of the type equipped with an ignition system; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a fluid operated motor for controlling shift of said clutch member; said motor comprising a pressure chamber and piston therefor adapted to operate said clutch member; and electrically operating means for automatically controlling the engine ignition system as a function of the operation of said motor comprising a switch operably associated with said motor.

References Cited in the file of this patent

UNITED STATES PATENTS

| | | |
|---|---|---|
| 1,185,538 | Oddie | May 30, 1916 |
| 2,322,479 | Schjolin | June 22, 1943 |

UNITED STATES PATENT OFFICE
CERTIFICATE OF CORRECTION

Patent No. 2,916,943                                                                     December 15, 1959

Carl A. Neracher et al.

It is hereby certified that error appears in the printed specification of the above numbered patent requiring correction and that the said Letters Patent should read as corrected below.

Column 6, line 4, for "lugs 18" read -- lugs 188 --; column 12, line 36, for "dspeed" read -- speed --; column 16, line 19, after "receive" insert -- drive --.

Signed and sealed this 24th day of May 1960.

(SEAL)
Attest:

KARL H. AXLINE                                                   ROBERT C. WATSON Attesting Officer                                              Commissioner of Patents